US010369064B2

United States Patent
Behrens

(10) Patent No.: US 10,369,064 B2
(45) Date of Patent: Aug. 6, 2019

(54) STEP-CLIMBING ATTACHMENT FOR A WHEELED CHAIR

(71) Applicants: Mobility 2000 (Australia) Limited, Rose Bay (AU); University of Technology, Sydney, Broadway (AU)

(72) Inventor: Michael Behrens, North Parramatta (AU)

(73) Assignee: MOBILITY 2000 (AUSTRALIA) LIMITED (AU)

( * ) Notice: Subject to any disclaimer, the term of this patent is extended or adjusted under 35 U.S.C. 154(b) by 0 days.

(21) Appl. No.: 15/551,260

(22) PCT Filed: Feb. 16, 2016

(86) PCT No.: PCT/AU2016/050100
§ 371 (c)(1),
(2) Date: Aug. 15, 2017

(87) PCT Pub. No.: WO2016/131095
PCT Pub. Date: Aug. 25, 2016

(65) Prior Publication Data
US 2018/0028380 A1   Feb. 1, 2018

(30) Foreign Application Priority Data
Feb. 16, 2015   (AU) ............................... 2015900509

(51) Int. Cl.
*A61G 5/06*     (2006.01)
*B62B 5/02*     (2006.01)
(Continued)

(52) U.S. Cl.
CPC ............. *A61G 5/061* (2013.01); *A61G 5/063* (2013.01); *A61G 5/068* (2013.01); *A61G 5/02* (2013.01);
(Continued)

(58) Field of Classification Search
CPC ........ A61G 5/061; A61G 5/063; A61G 5/068; A61G 5/02; A61G 5/045; B62B 5/02; B62B 9/02
See application file for complete search history.

(56) References Cited

U.S. PATENT DOCUMENTS 2,653,672 A * 9/1953 Wessie .................... B62B 5/023
                                                           180/8.2
3,104,112 A * 9/1963 Crail ...................... A61G 5/061
                                                           280/211
(Continued)

FOREIGN PATENT DOCUMENTS

CN         1124954 C      10/2003
CN         1188311 C       2/2005
(Continued)

OTHER PUBLICATIONS

International Search Report and Written Opinion for PCT/AU2016/050100, dated May 30, 2016.
(Continued)

*Primary Examiner* — Joseph M Rocca
*Assistant Examiner* — Daniel S Yeagley
(74) *Attorney, Agent, or Firm* — Procopia, Cory, Hargreaves & Savitch LLP

(57) ABSTRACT

A step-climbing attachment for a wheeled chair, the attachment comprising a first wheel having at least a hub and a rim spaced from the hub, the hub and rim defining an inner region, a second wheel having a different diameter than the first wheel, and the second wheel being rotatably mounted to an extending arm, the extending arm being movable relative to the first wheel between a first position and at least one second position by a controllable mechanism, wherein the controllable mechanism is housed at least partially within (Continued)

the inner region of the first wheel, wherein the second wheel is driven by rotation of the first wheel.

10 Claims, 13 Drawing Sheets

(51) Int. Cl.
  *B62B 9/02* (2006.01)
  *A61G 5/02* (2006.01)
  *A61G 5/04* (2013.01)
(52) U.S. Cl.
  CPC ............ *A61G 5/045* (2013.01); *B62B 5/02* (2013.01); *B62B 9/02* (2013.01)

(56) References Cited

U.S. PATENT DOCUMENTS

| | | | | |
|---|---|---|---|---|
| 4,455,029 | A * | 6/1984 | Taylor | A61G 5/023 180/8.2 |
| 6,341,784 | B1 * | 1/2002 | Carstens | A61G 5/061 180/8.2 |
| 6,386,552 | B1 * | 5/2002 | Bierma | B62B 5/023 180/8.2 |
| 2002/0104692 | A1 * | 8/2002 | Nakatsukasa | A61G 5/061 180/8.3 |
| 2007/0145711 | A1 | 6/2007 | Mulhern et al. | |
| 2010/0096816 | A1 * | 4/2010 | Cheng | A61G 5/068 280/5.2 |
| 2014/0083788 | A1 | 3/2014 | Behrens | |
| 2014/0265211 | A1 | 9/2014 | Hansen et al. | |
| 2015/0129328 | A1 | 5/2015 | Behrens | |

FOREIGN PATENT DOCUMENTS

| | | | | |
|---|---|---|---|---|
| CN | 202235988 | U | 5/2012 | |
| CN | 103501747 | A | 1/2014 | |
| CN | 204095861 | U | 1/2015 | |
| EP | 0062180 | A2 | 10/1982 | |
| EP | 1493418 | A1 | 1/2005 | |
| GB | 2258196 | A | 2/1993 | |
| WO | 2003/029070 | A1 | 4/2003 | |
| WO | WO-2012106756 | A1 * | 8/2012 | ............... A61G 5/04 |
| WO | 2014/124482 | A1 | 8/2014 | |
| WO | 2016/156620 | A1 | 10/2016 | |

OTHER PUBLICATIONS

"Galileo Stair Climbing Wheelchair" YourTube: https://www.youtube.com/watch?v=ik286spRM1w, published Mar. 25, 2009.
First Search Report issued in copending Chinese Application No. CN 201680010615X dated Oct. 18, 2018, in 3 pages.
Supplementary European Search Report dated Aug. 10, 2018 for related EP Patent Application No. EP 16751818 in 2 pages.

* cited by examiner

STEP-CLIMBING ATTACHMENT FOR A WHEELED CHAIR

TECHNICAL FIELD

The present invention relates generally to step climbing attachments suitable for use in a range of movable items such as for example trolleys, walkers, wheelbarrows, chairs, scooters, or the like. In selected embodiments, the invention relates to wheeled chairs including wheelchairs to afford increased accessibility for infirm people and less able people.

BACKGROUND

Chairs, movable baskets and trolleys, walkers, scooters, or the like are useful for carrying and moving items such as luggage, groceries, heavy items, as well as people. Some of these items may be motorised, but many versions of these devices have limitations when negotiating stairs. Some wheeled attachments are also known but involve cumbersome, large and inflexible apparatus.

Wheelchairs in particular can be very difficult to operate over uneven ground, kerbs, gutters, single steps and staircases, among other such similar variations to relatively smooth surfaces. This is so if the wheelchair is a manually-pushed chair but particularly so for a powered chair which uses electrical power for propulsion and steering. These latter types of chair, due to the propulsion and onboard energy storage systems are relatively heavy and large, and known models often have difficulty driving over uneven ground, and particularly over kerbs, gutters, single steps and staircases.

The present invention provides improved step climbing attachments suitable for use with wheeled chairs and other vehicles such as wheelchairs. It will be appreciated in referring to step-climbing attachments that the attachment can be used to descend steps and also to climb and/or descend other obstacles including kerbs, gutters, staircases and the like.

Any discussion of documents, acts, materials, devices, articles, or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In one aspect, we describe a step-climbing attachment for a wheeled chair, the attachment comprising:

a first wheel having at least a hub and a rim spaced from the hub, the hub and rim defining an inner region;

a second wheel having a different diameter than the first wheel; and the second wheel being rotatably mounted to an extending arm;

the extending arm being movable relative to the first wheel between a first position and at least one second position by a controllable mechanism;

wherein the controllable mechanism is housed at least partially within the inner region of the first wheel;

wherein the second wheel is driven by rotation of the first wheel.

In some embodiments, the wheeled chair is a power wheelchair having at least one pair of drive wheels (i.e. wheels that are powered to propel the chair). The wheel chair can have at least one pair of castor wheels (i.e. wheels that are not necessarily powered for propulsion of the chair, but which assist in maneuverability of the chair). In some such embodiments, a step-climbing attachment in accordance with the invention is particularly well suited to attach adjacent to, or to replace, one or both drive wheels in a pair.

The first wheel can comprise a rim supporting member. The rim supporting member can comprise one or more spoke members that extend from the hub to the rim. The spoke members can be equally spaced. The length of the spoke members can define the diameter of the first wheel.

The second wheel can have a diameter smaller than the diameter of the first wheel.

Movement of the first wheel can lead to movement of the second wheel.

The controllable mechanism can be substantially mounted within the inner region of the first wheel. In another embodiment, the controllable mechanism can be wholly mounted within the inner region of the first wheel.

In one embodiment, the controllable mechanism can comprise a motor. The motor can comprise an electric motor.

The second wheel can comprise a step engaging wheel that can be selectively moved (for example raised or lowered) into a step engaging position by movement of the extending arm relative the first wheel. The extending arm can comprise a threaded aperture which engages a threaded rod. The threaded rod may be threaded along some, the majority or substantially all of its length. The threaded rod can be rotatable in a clockwise or anti-clockwise direction such that rotation of the rod causes movement of the extending arm relative to the first wheel and, in at least some embodiments, relative to a surface on which the first wheel is driving or being driven.

The direction of rotation of the threaded rod will preferably determine the direction in which the extending arm is moved relative to the first wheel. The direction of rotation of the threaded portion can be altered by inputting a signal to the controllable mechanism via a controller. The controller can comprise a joystick and/or a panel comprising a plurality of buttons and switches, or the like. As the rod rotates the threaded aperture will be displaced along the length of the rod. The movement of the threaded aperture along the rod thereby moves the step engaging wheel relative to the first wheel. In preferred embodiments, movement of the threaded aperture along the rod in one direction takes the step engaging wheel away from the surface on which the first wheel is driving or being driven, and movement of the threaded aperture along the rod in an opposite direction takes the step engaging wheel toward the surface on which the first wheel is driving or being driven. The threaded rod is operatively associated with a drive mechanism driven by the motor. In some embodiments, the rod can be connected to the drive mechanism via a belt or gear such that rotation of the drive mechanism drives the belt which, in turn, rotates the rod. In another embodiment, the drive mechanism can comprise a motor itself.

In some particularly preferred embodiments, the controllable mechanism is substantially or completely housed within the inner region of the first wheel. In such embodiments, and in other preferred and alternative embodiments, the ability to substantially or completely house the controllable mechanism in the inner region of the first wheel permits the step-climbing attachment to be:

retro-fitted to existing wheeled chairs as an after-market adaptation or 'add-on', without having to make significant alterations to surrounding structures on the wheeled chair. In some embodiments, retro-fitting is achieved by removing the existing drive wheel from the wheeled chair and replacing it with the step-climbing attachment (and then integrating a suitable electronic interface as necessary); or incorporated into the manufacturing pipeline of new wheeled chairs so that the step-climbing accessory is made available from the time of purchase.

In another embodiment, the drive mechanism is connected to a first wheel which is surrounded by the belt which is paired to a second driven wheel. The second driven wheel then engages the rod.

It will be appreciated that the extending arm can be moved between a range of positions as required.

In a still further embodiment, the second wheel can be in the form of a planetary wheel assembly and be mounted to a distal end of the extending arm so as to at least partially orbit the first wheel.

A belt can extend between a drive mechanism for the first wheel or a pulley (or similar mechanism) mounted to or integral with the first wheel and a pulley (or similar mechanism) mounted to or integral with the second wheel so that the second wheel is also driven on rotation of the first wheel.

The belt can extend around an idler wheel disposed between the first and second wheels.

While described as a step-climbing attachment, it will be appreciated that the attachment is provided to facilitate progress of a chair over any form of obstacle that prevents propulsion of the chair in a particular direction. For example, the attachment can be used to climb not just one or more stairs but also may be used to climb kerbs, gutters, rims, and/or other obstacles.

Where the attachment is mounted to, or adjacent, each or both drive wheels or a pair of drive wheels, the attachment can operate in the following manner to climb a step, kerb or the like:

the chair is driven towards the step with the first wheel on a surface in front of the step;

if not positioned sufficiently high, the extending arm can be rotated relative the first wheel to allow the second wheel to be positioned adjacent, on or above the tread portion of the step;

the extending arm can then be rotated relatively toward the surface to move the second wheel into tractional engagement with the step or the tread portion of the step;

this rotation of the arm can continue in substantially the same direction so elevating the first wheel from the surface and eventually to a position where it can tractionally engage the step or the tread portion of the step;

simultaneously or relatively shortly after commencement of rotation of the extending arm as described above, the first wheel can be driven, in turn or additionally causing the second wheel (which is tractionally engaged with the step or the tread portion of the step) to propel the chair forward; and the extending arm can then optionally be rotated relatively upwardly so elevating the second wheel from the tread portion and leaving the chair supported by the first wheel on the tread portion.

Where the attachment is mounted to, or adjacent, each or both drive wheels of a pair of drive wheels, the attachment can operate in the following manner to descend a step, kerb or the like:

the chair is driven towards the top of the step with the first wheel on the surface in front of the step until the second wheel is positioned beyond the step edge;

the extending arm can then be rotated relative to the first wheel to move the second wheel toward and into tractional engagement with a surface that is below the step;

the first wheel can be driven which in turn can cause the second wheel to propel the chair forward so that the second wheel is supporting the chair; and the extending arm can then be optionally rotated relatively upwardly so elevating the second wheel from the tread portion and allowing the first wheel to move relatively downwardly into contact with the surface below the step.

In some embodiments, it is desirable that the user seat of the chair remain at least substantially horizontal whilst the chair is ascending or descending a step. As such, during operation of the attachment in at least some of such embodiments, at least one castor wheel or each castor wheel of each castor wheel pair can be capable of elevating or lowering the chair, as necessary, so that the user seat of the chair maintains a substantially horizontal orientation. Examples of wheels that can be used are described in U.S. application Ser. No. 14/004,649 and U.S. application Ser. No. 14/577,108, the contents of which are incorporated by reference.

In another aspect, we describe a wheeled chair comprising at least one step-climbing attachment as defined herein.

In one embodiment, the wheeled chair can have two step-climbing attachments mounted to an axle.

The first wheels can provide propulsion to the wheeled chair.

Still further, the first wheels can be the front wheels of the chair, the rear wheels of the chair or the mid wheels of the chair.

In another embodiment, the wheel or wheels of the attachment can be positioned to assist in stabilising the wheeled chair when transitioning onto an upwardly or downwardly extending ramp. In this regard, the second wheel or wheels act essentially as an anti-tipping device for the wheeled chair.

For example, as the wheeled chair approaches an upwardly extending ramp, the second wheel or wheels can tractionally contact the ramp and provide support and propulsion to the wheeled chair even when the first wheels lift off the ground or lose full traction. This provides a significant improvement to the state of the art with respect to current anti-tipping devices when used on front wheel drive wheeled chairs. Current anti-tipping devices are typically not driven, and therefore often lead to situations, particularly when a front wheel drive wheeled chair is being driven toward an upwardly extending ramp or surface, in which a wheeled chair becomes immobilised because the drive wheel is elevated off the surface by virtue of the physical relationship between the anti-tipping device and the upwardly sloping surface and the castor wheels and the adjacent relatively flat or downwardly sloping surface.

As the drive wheel in such arrangements is interposed between the anti-tipping device and the castor wheels, it is elevated off the surface or to a position relative to the surface in which there is insufficient traction between the drive wheel and the surface to enable the drive wheel to propel the chair. In such situations, a user can be left immobilised with the drive wheel doing nothing more than rotating in space (above the surface).

In another embodiment, it is possible for the second wheel or wheels to be lowered to the ground even during normal forward or backwards movement of the wheeled chair. This can be done to increase overall traction of the wheeled chair with the ground and/or stability of the wheeled chair.

In yet another embodiment, it will be appreciated that the step-climbing attachment can be used to provide greater ground clearance for the wheeled chair during operation. It can also be used simply to raise the relative height of the chair even when no obstacle is to be avoided or a step needs to be navigated. This can be useful when the chair occupant simply needs to be seated at a height that is relatively greater than the usual height of the chair. This might be the case, for example, where the occupant wishes to reach items on a desk or bench.

In another aspect, we describe a method of modifying a wheeled chair to allow it to climb or descend one or more steps or the like comprising:

where still present, removing at least one drive wheel from the wheeled chair; and attaching a step-climbing attachment as described herein.

In this aspect, two step-climbing attachments can be attached to the wheeled chair. The step-climbing attachment can be controllable by a controller, such as defined herein.

In yet another aspect, we describe a method of operating a wheeled chair to climb a step, the wheeled chair having at least one step-climbing attachment as defined herein, the method comprising:

driving the chair towards a step having a tread portion with the first wheel on a surface in front of the step;

optionally rotating the extending arm relative the first wheel to allow the second wheel to be positioned adjacent, on or above the tread portion of the step;

rotating the extending arm relatively toward the surface of the step or the tread portion of the step to move the second wheel into tractional engagement with the step or the tread portion of the step;

continuing the relative rotation of the extending arm in substantially the same direction so elevating the first wheel from the surface and eventually to a position where it can tractionally engage the step or the tread portion of the step;

simultaneously or relatively shortly after commencement of rotation of the extending arm as described above, driving the first wheel which in turn or additionally causes the second wheel which is tractionally engaged with the step or the tread portion of the step, to propel the chair forward.

In this aspect, the method can comprise, after the first wheel has tractionally engaged the step or the tread portion of the step:

rotating the extending arm relatively upwardly so elevating the second wheel from the tread portion and leaving the chair supported by the first wheel on the tread portion.

In yet another aspect, we describe a method of operating a wheeled chair to descend a step, the wheeled chair having at least one step-climbing attachment as defined herein, the method comprising:

driving the chair towards the edge of the step with the first wheel on the surface in front of the step and until the second wheel is positioned beyond the step edge;

rotating the extending arm relative to the first wheel to move the second wheel toward and into tractional engagement with a surface that is below the step;

driving the first wheel which in turn or additionally causes the second wheel to propel the chair forward so that the second wheel is supporting the chair.

In this aspect, the method can comprise:

relatively rotating the extending arm upwardly so elevating the second wheel from the surface on which it has been tractionally engaged and allowing the first wheel to move relatively downwardly into contact with the surface below the step.

While the above description focuses on a wheeled chair, it will be appreciated that the attachment can also be used on other devices including trolleys, walkers, wheelbarrows, chairs, scooters, or the like. It is to be understood that any reference to wheeled chair in this specification could be replaced with other wheeled devices, such as trolleys, walkers, wheelbarrows, chairs, scooters, or the like.

BRIEF DESCRIPTION OF DRAWINGS

Examples are now depicted in the following drawings, in which.

DESCRIPTION OF EMBODIMENTS

An example of a motorised wheeled chair having a step climbing attachment is depicted generally as 100 in FIGS. 1a to 1d. The depicted chair comprises a seat 101, a step climbing attachment 10 and castor wheels 30. The castor wheels 30 assist in maneuverability of the chair 100 and also assist (as described in more detail below) in keeping the seat 101 at least substantially horizontal during step climbing and descending. Control of the motorised chair 100 is undertaken through a controller having a joystick.

In FIGS. 1a to 1d, the wheeled chair 100 is depicted with the step climbing attachment 10 at the rear of the chair 100. It will be appreciated that the chair 100 can be constructed such that the step climbing attachment 10 is at the front of the chair 100. Other positions can also be envisaged.

Figure 1A:
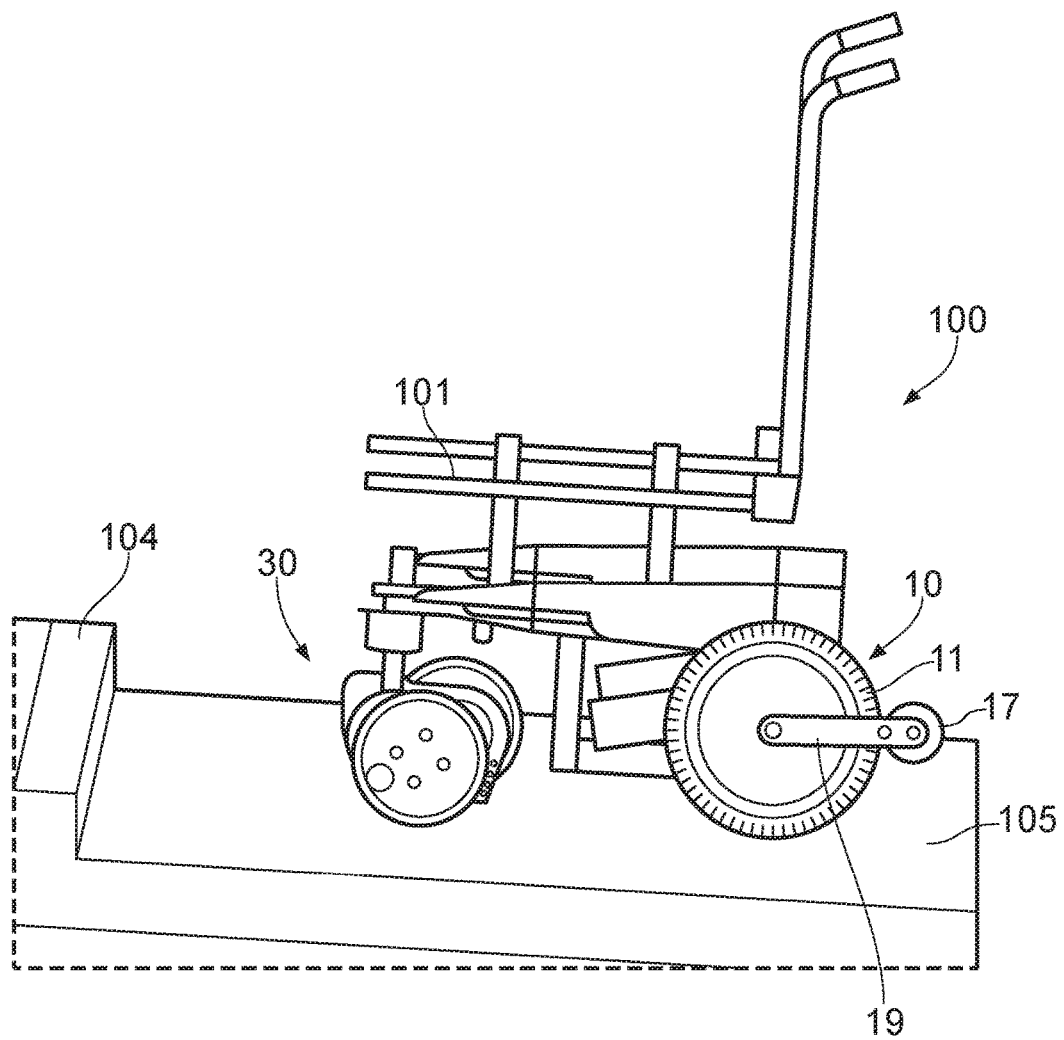
FIGS. 1a to 1d depict simplified views of one embodiment of a wheeled chair having a step climbing attachment.
Figure 1B:
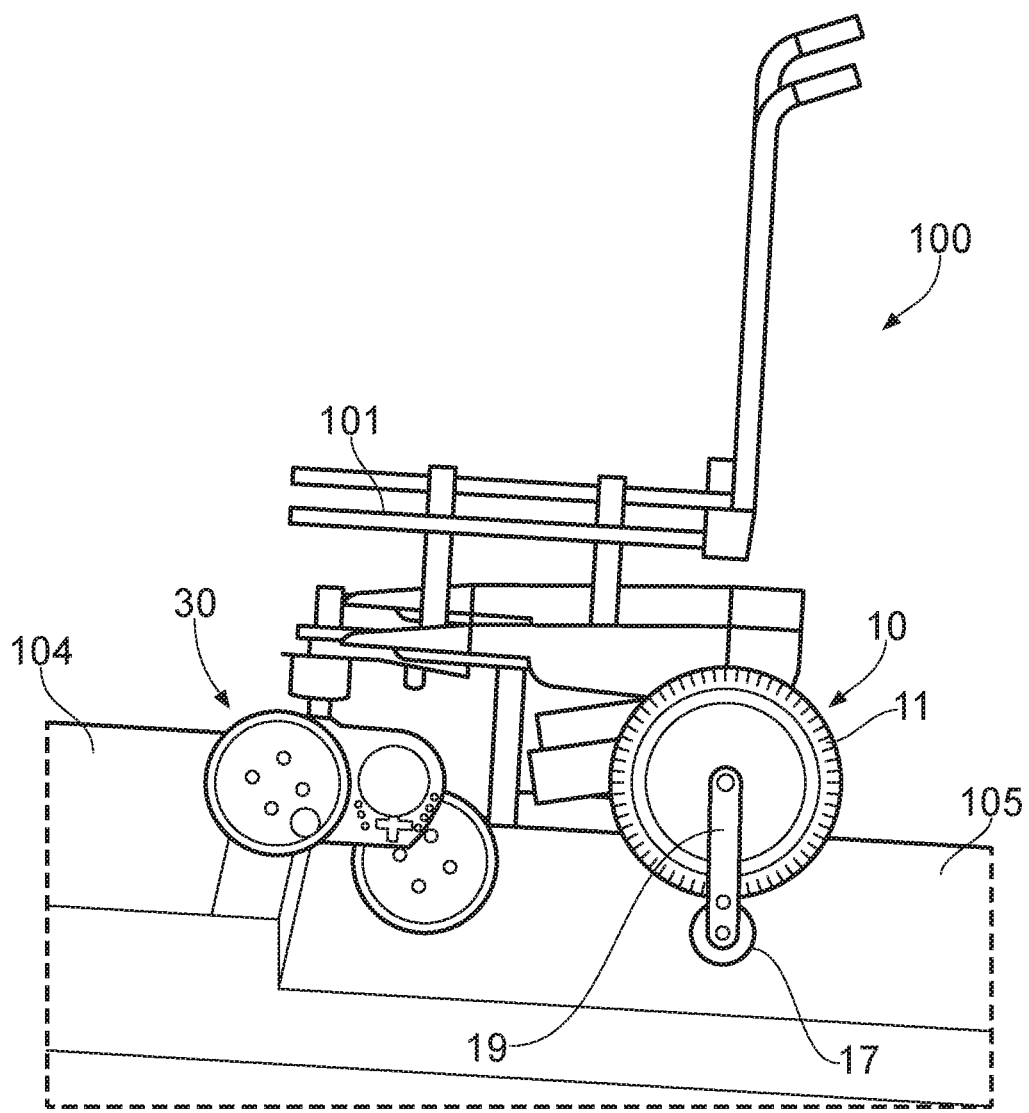
Figure 1C:
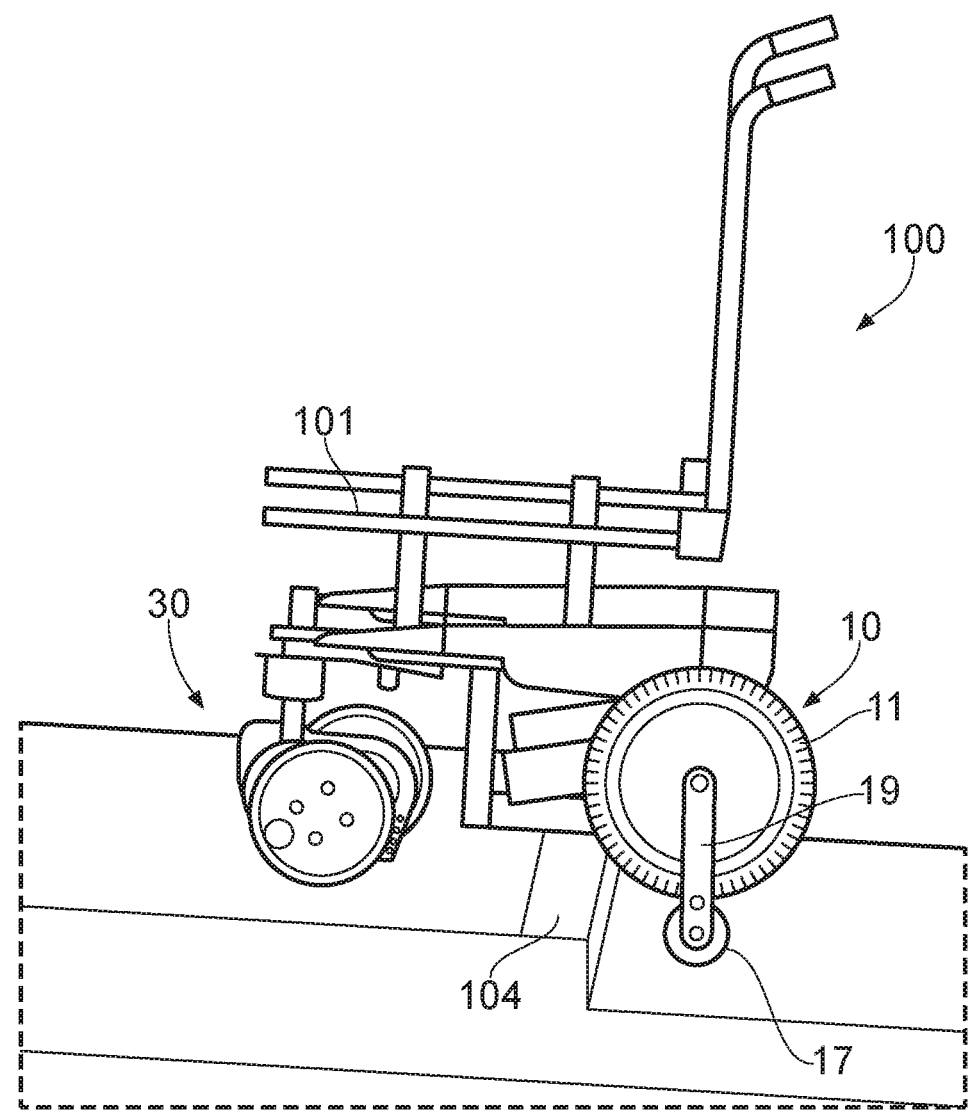
Figure 1D:
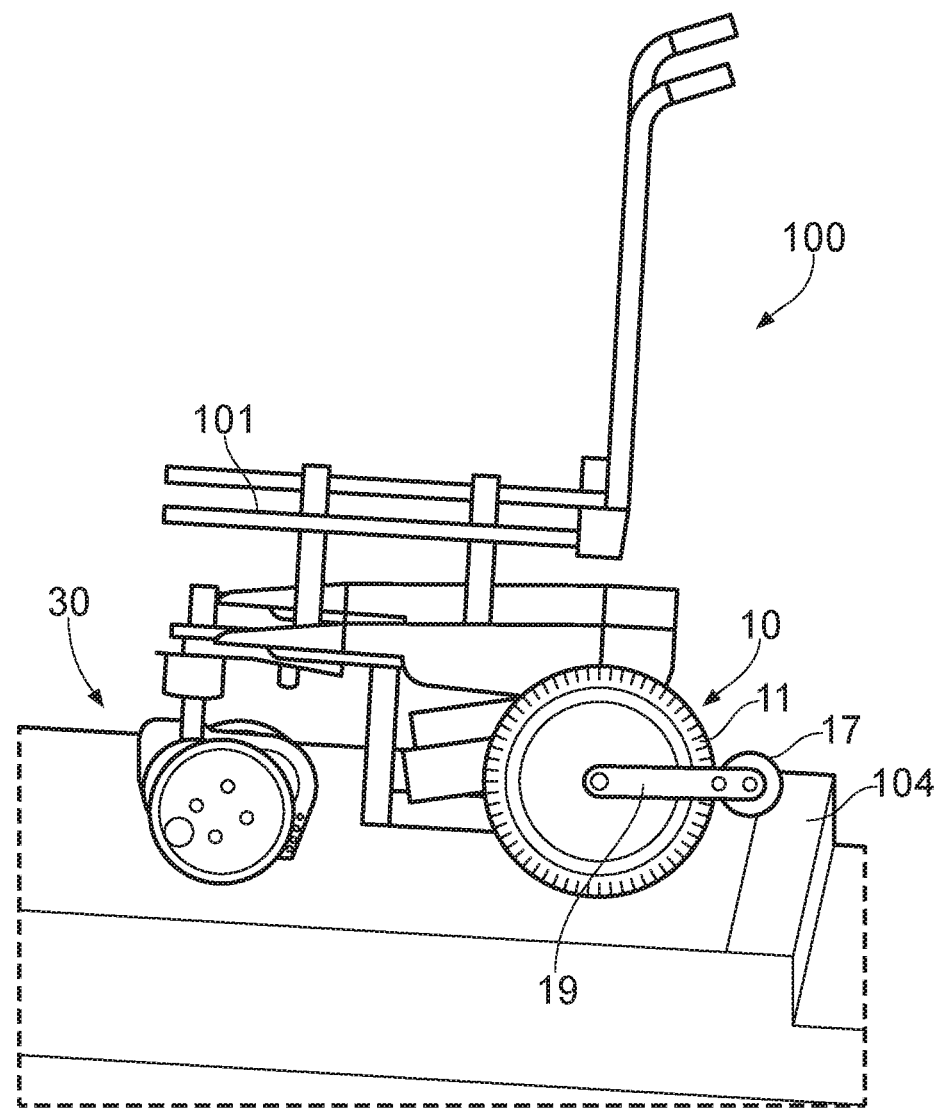

FIG. 1a depicts the chair in position before it is about to climb a step 104. FIG. 1b depicts the chair 100 commencing to climb the step 104. FIG. 1c depicts the chair 100 having almost completed climbing of the step 104. FIG. 1d depicts the chair after it has climbed the step 104.

Figure 2:
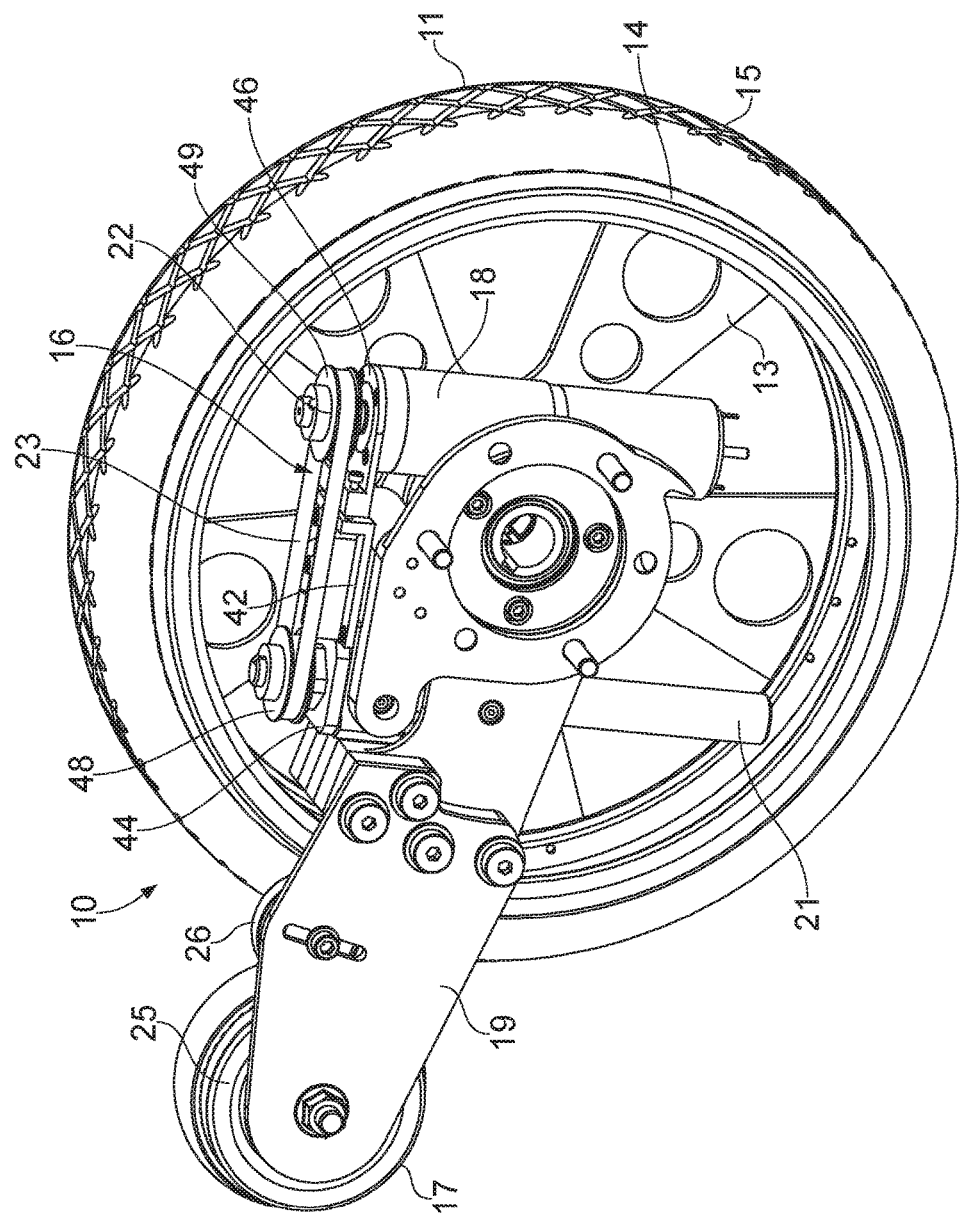
FIG. 2 is a perspective view of one embodiment of a step-climbing attachment with the second wheel in a relatively upwards position.
Figure 3:
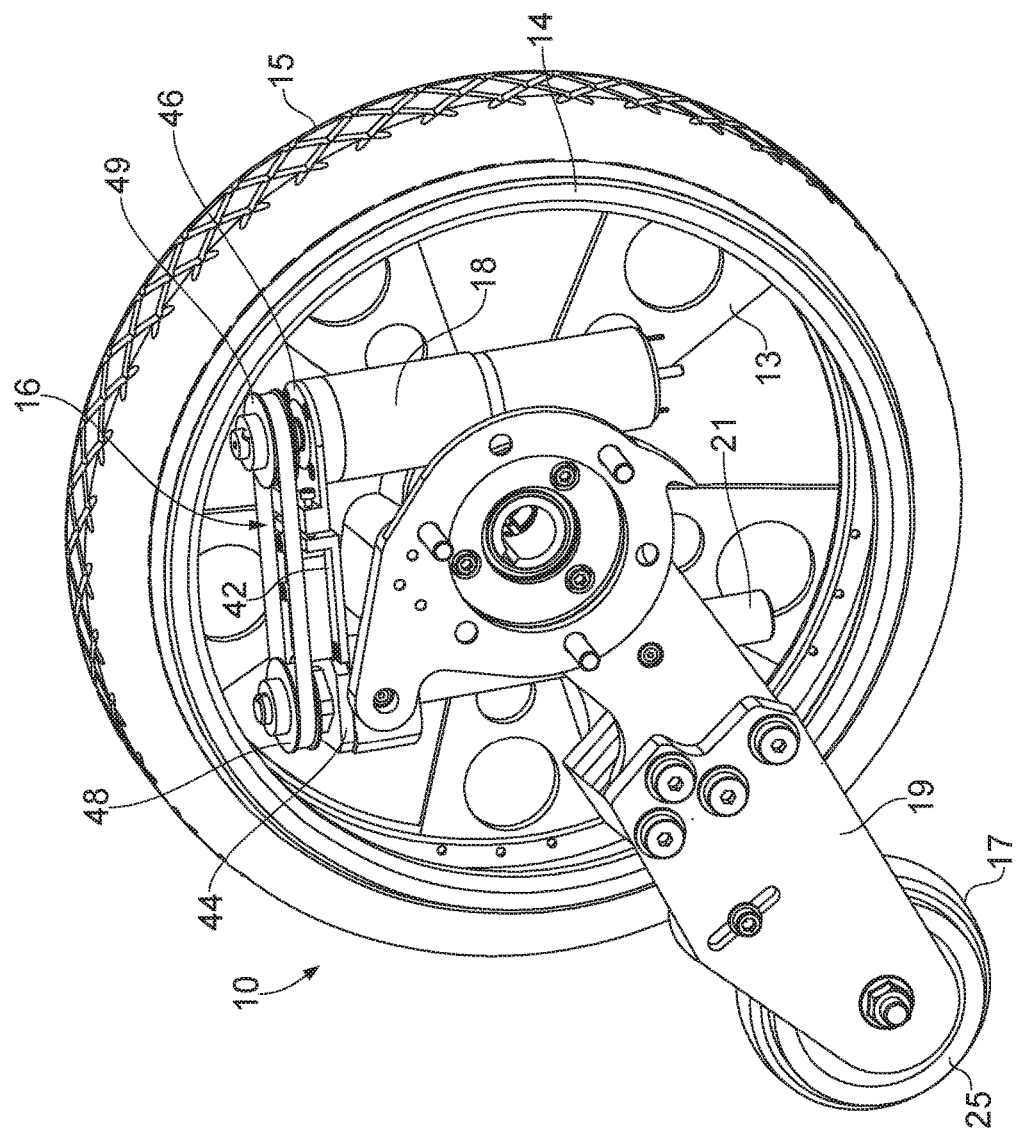
FIG. 3 is a perspective view of one embodiment of the step-climbing attachment of FIG. 2 but with the second wheel in a relatively downwards position.
Figure 4:
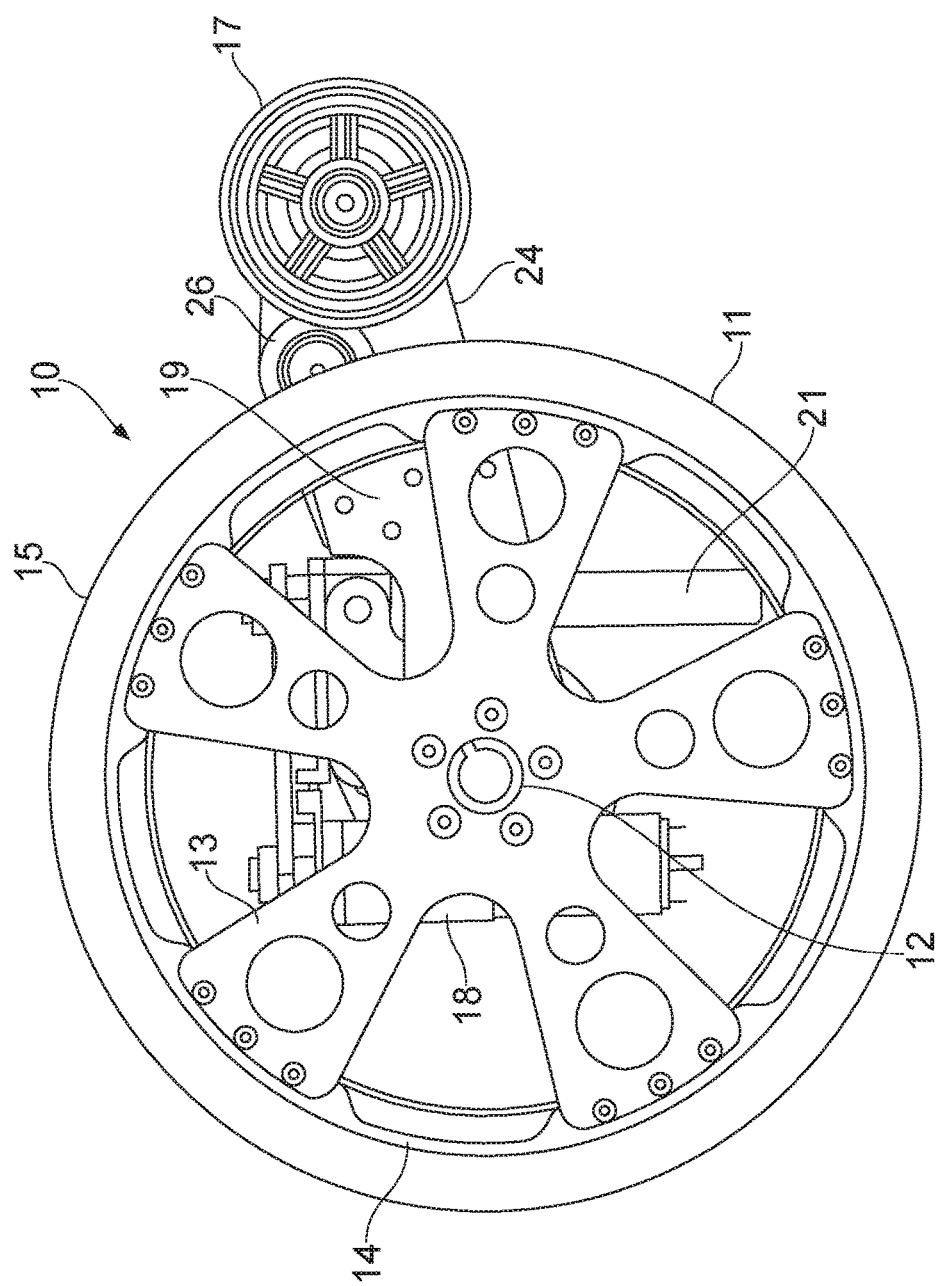
FIG. 4 is a side elevational view of the step-climbing attachment.

An example of a step-climbing attachment is depicted generally as 10 in FIGS. 2-4. As depicted in FIGS. 1a to 1d, the step climbing attachment 10 can be retrofitted to the rear of the wheeled chair 100. It will be appreciated that it could also be retrofitted to the front of the wheeled chair 100, other types of wheeled chairs, or a wheeled chair could be built specifically designed for the attachment 10.

The depicted step-climbing attachment 10 comprises a first wheel 11 having at least a hub 12 and a rim 14. A rim supporting member 13 in the form of a series of spokes is also provided. The rim 14 supports a tyre member 15 that can have a tread pattern (as depicted).

As depicted in FIGS. 2 and 3, at least the hub 12 and the rim 14 define an inner region within which a controllable mechanism 16 is at least partially, if not substantially or wholly, housed. In operation, it will be appreciated that the controllable mechanism 16 will be mounted relatively inside the first drive wheel 11 when it is mounted to a wheeled chair.

In addition to the first wheel 11, the attachment 10 comprises a second wheel 17. This second wheel 17 has a different, as depicted a smaller, diameter than the first wheel 11.

The second wheel is rotatably mounted to an extending arm 19. The extending arm 19 is movable relative to the first wheel 11 between a first position (such as depicted in FIG. 2) and at least one second position (such as depicted in FIG. 3) by operation of the controllable mechanism 16.

The second wheel 17 is driven by rotation of the first wheel 11.

In the depicted embodiment, the controllable mechanism 16 comprises an electric motor 18.

The depicted second wheel 17 acts as a step engaging wheel that can be selectively moved by movement of the extending arm 19. Relative rotation of the extending arm 19 is used to relatively raise and lower the step engaging wheel 17. The extending arm 19 can comprise a threaded aperture which engages a threaded rod 21. The threaded rod 21 may be threaded along some, the majority, or substantially all of its length. The threaded rod 21 is rotatable in a clockwise or anti-clockwise direction such that rotation of the rod 21 causes a rotatable movement of the extending arm 19 relative to the first wheel 11 and the surface on which the chair is driving or being driven.

The direction of rotation of the threaded rod 21 can determine the direction in which the extending arm 19 is moved relative to the first wheel 11. The direction of rotation of the threaded rod 21 can be altered by inputting a signal to the electric motor 18 via a controller. The controller can comprise a joystick and/or a panel comprising a plurality of buttons and switches. As the rod 21 rotates, the threaded aperture will be displaced along the length of the rod 21. The movement of the threaded aperture along the rod 21 thereby moves the step engaging wheel 17 relative to the first wheel 11 and as depicted by the differences in relative position of the extending arm 19 to the first wheel 11 in FIGS. 2 and 3.

In preferred embodiments, movement of the threaded aperture along the rod 21 in one direction takes the step engaging wheel 17 away from the surface 105 on which the first wheel 11 is driving or being driven, and movement of the threaded aperture along the rod 21 in an opposite direction takes the step engaging wheel 17 toward the surface 105 on which the first wheel 11 is driving or being driven.

The threaded rod 21 is operatively associated with a drive mechanism 22 driven by the motor 18. In the depicted embodiment, a bracket 42 fixes a bearing housing 44 of the rod 21 and the motor 18 housing relative to one another. The bracket 42 is coupled to a bearing housing 44 of the threaded rod 21 and a motor bracket 46 of the motor 18 by fasteners. The rod 21 is then connected to the drive mechanism 22 via a belt 23 such that rotation of the drive mechanism 22 drives the belt 23 which, in turn, rotates the rod 21. The belt 23 may be connected to the rod 21 and the drive mechanism 22 via a rod pulley 48 and a drive pulley 49.

The electric motor 18 may be a gear motor. In order reduce the size of the controllable mechanism 16 whilst maintaining its load carrying capacity, the size of the rod pulley 21a and the gear ratio of the motor 18 may be chosen so as provide an overall gear ratio of between 30:1 and 60:1, and preferably 50:1 and 60:1. In one example the gear overall gear ratio is 54:1.

In another embodiments, the drive mechanism can comprise a motor itself. It will be appreciated that other suitable drive linkages between the motor 18 and drive mechanism 22 and the rod 21 than that depicted could be utilised.

The second wheel 17 can be regarded as a form of a planetary wheel assembly with the wheel 17 being mounted to a distal end of the extending arm 19 so as to at least partially orbit the first wheel 11.

A belt 24 (not depicted in all figures for clarity reasons) can extend between the rim 14 or a pulley attached to the rim 14 of the first wheel 11 and a pulley 25 mounted to the second wheel 17 so that the second wheel 17 is also driven on rotation of the first wheel 11.

The belt 24 can extend around an idler wheel 26 disposed between the first and second wheels (11, 17).

While described as a step-climbing attachment, it will be appreciated that the depicted attachment 10 is provided to facilitate progress of a chair over any form of obstacle that prevents propulsion of the chair in a particular direction. For example, the attachment can be used to climb not just one or more stairs but also may be used to climb kerbs, gutters, rims, and/or other obstacles.

Where the attachment 10 is mounted to the front of a wheeled chair, the attachment can operate in the manner as described below. In considering this operation, it will be appreciated that FIGS. 1a to 1d depict the step climbing attachment 10 on the rear of the chair 100. Operation of the chair where the attachment 10 is at the front of the chair can still be readily understood.

The chair 100 can be driven towards the step 104 with the first wheel 11 on the surface 105 in front of the step.

If not positioned sufficiently highly, the extending arm 19 can be rotated relative the first wheel 11 to allow the second wheel 17 to be positioned adjacent, on or above the tread portion of the step 104.

The extending arm 19 can then be rotated relatively towards the surface of the step 104 to move the second wheel 17 into tractional engagement with the tread portion of the step 104.

This rotation of the extending arm 19 can continue so elevating the first wheel 11 from the surface and eventually to a position where it can tractionally engage the step 104 or the tread portion of the step 104.

Simultaneously or relatively shortly after commencement of rotation of the extending arm 19, the first wheel 11 can be driven which in turn or additionally causes the second wheel 17 (which is tractionally engaged with the step 104 or the tread portion of the step 104) to propel the chair 100 forward.

The extending arm 19 can then be rotated relatively upwardly so elevating the second wheel 17 from the tread portion and leaving the chair 100 supported by the first wheel 11 on the tread portion of the step 104.

Where the attachment 10 is mounted to the chair 100, the attachment 10 can operate in the following manner to descend a step (such as step 104), a kerb or the like.

The chair 100 can be driven towards the top of the step 104 with the first wheel 11 on the surface in front of the step 104 until the second wheel 17 is positioned beyond the step edge.

The extending arm 19 can then be rotated relative to the first wheel 11 to move the second wheel 17 toward and into tractional engagement with a surface that is below the step 104.

The first wheel 11 can be driven which in turn can cause the second wheel 17 to propel the chair 100 forward so that the second wheel 17 is supporting the chair (like how is depicted in FIG. 1c).

The extending arm 19 can then be optionally rotated relatively upwardly so elevating the second wheel 17 from the surface and allowing the first wheel 11 to move relatively downwardly into contact with the surface below the step 104.

While the above description focuses on use of a step climbing attachment 10 at the front of the chair 100, as depicted in FIGS. 1a to 1d, the step climbing attachment 10 can be at the rear of the chair 100. In this case, it can be seen that as the chair 100 approaches the step 104 (moving from FIG. 1a to FIG. 1b), the extending arm 19 can be rotated to move the second wheel 17 into contact with the surface 105 and so relatively elevating the first wheel 11.

As the first wheel 11 keeps driving, so the second wheel 17 is also driven thereby propelling the chair 100 forwards to the position depicted in FIG. 1c. At that point the first wheel 11 is so positioned that it can relatively readily roll onto the step 104. At this stage, the extending arm 19 can rotate relatively upwardly to the position depicted in FIG. 1d.

In some embodiments, it is desirable that at least the seat 101 of the chair 100 remain at least substantially horizontal during step climbing. As such, during operation of the attachment, it is preferred that castor wheels are provided. Where the step climbing attachment 10 is at the rear of the chair 100, the castor wheels 30 can be at the front of the chair 100 (as depicted in FIGS. 1a to 1d). Where the step climbing attachment 10 is at the front of the chair 100, the castor wheels 30 can be positioned at the rear of the chair. Examples of wheels 30 that can be used are depicted in FIGS. 4 and 5 and are also described in U.S. application Ser. No. 14/004,649 and U.S. application Ser. No. 14/577,108, the contents of which are incorporated by reference. Use of other suitable rear wheels can be envisaged.

Figure 5A:
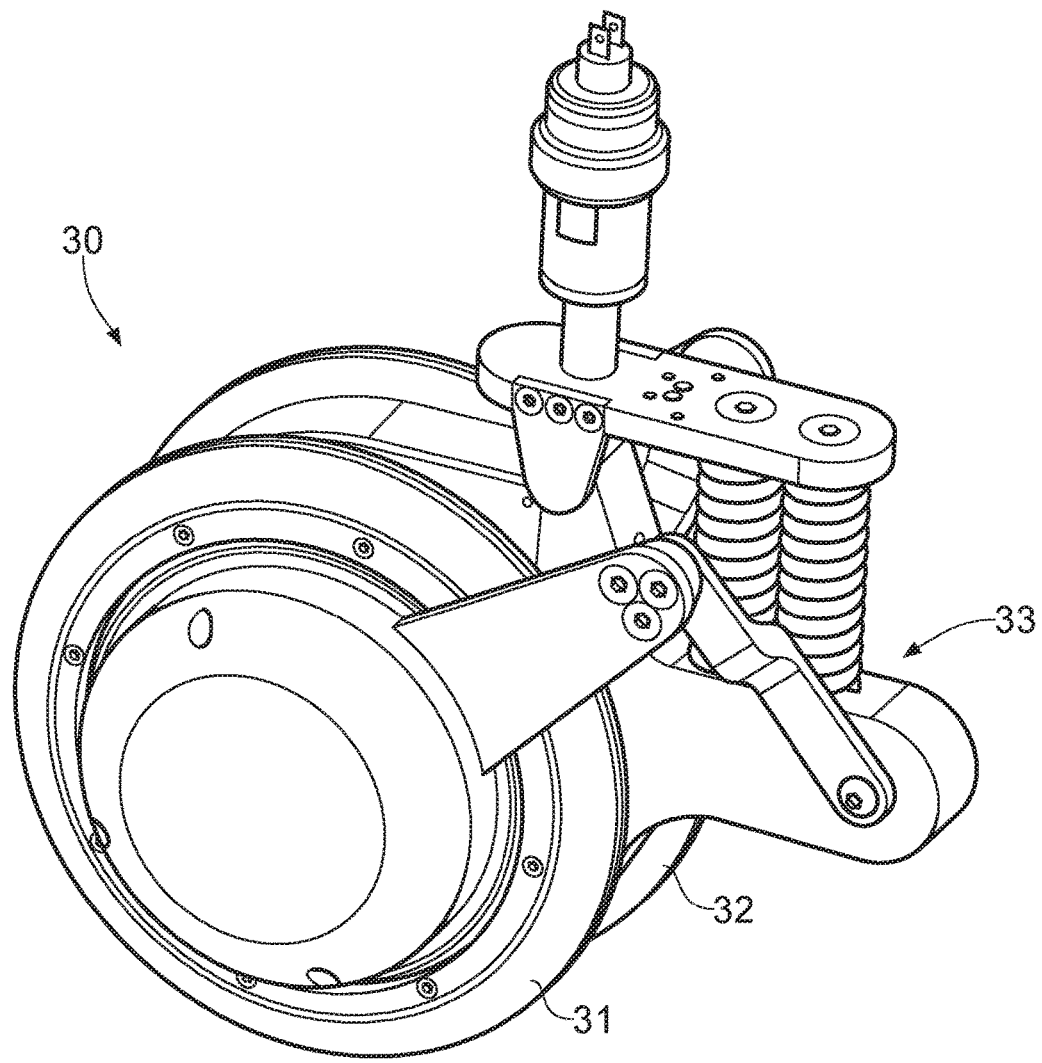
FIGS. 5a to 5c provide various views of a caster wheel arrangement which can be mounted to a wheeled chair and assist operation of the wheeled chair when step-climbing or performing other acts as described herein.
Figure 5B:
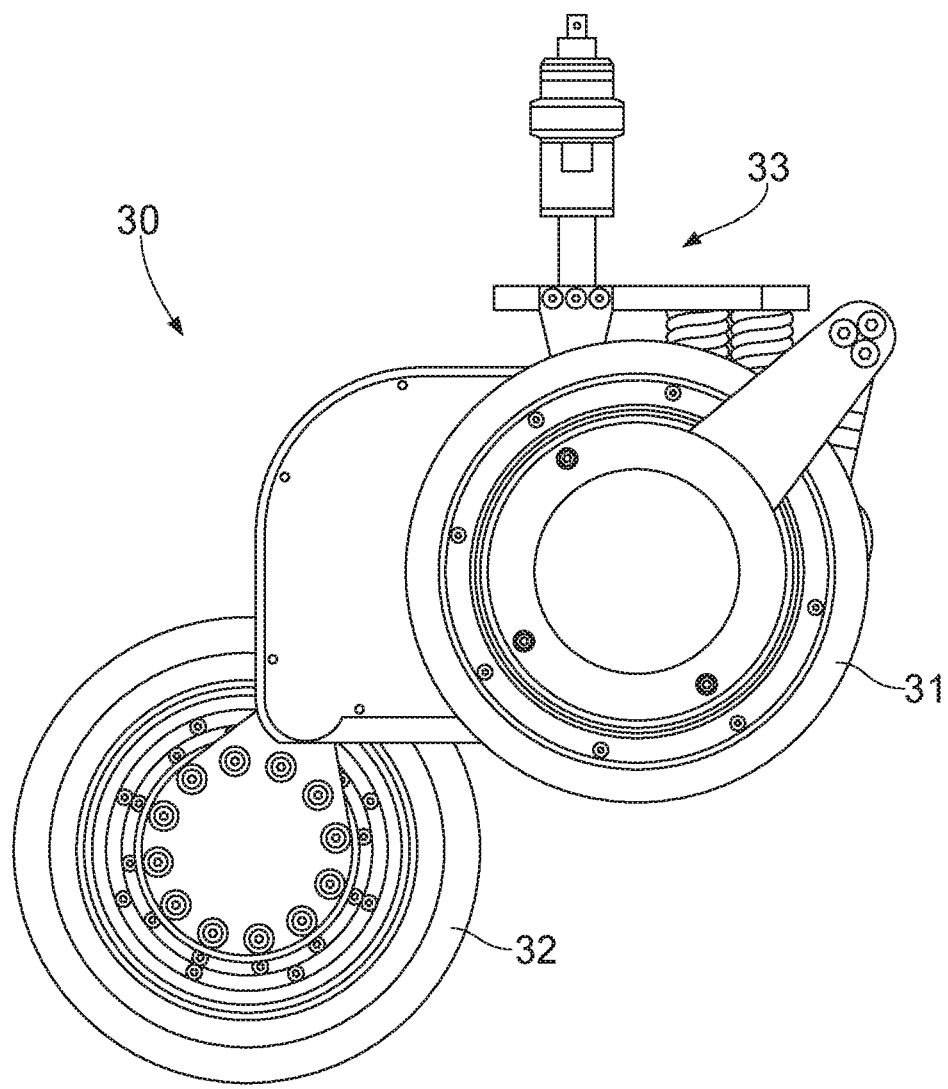
Figure 5C:
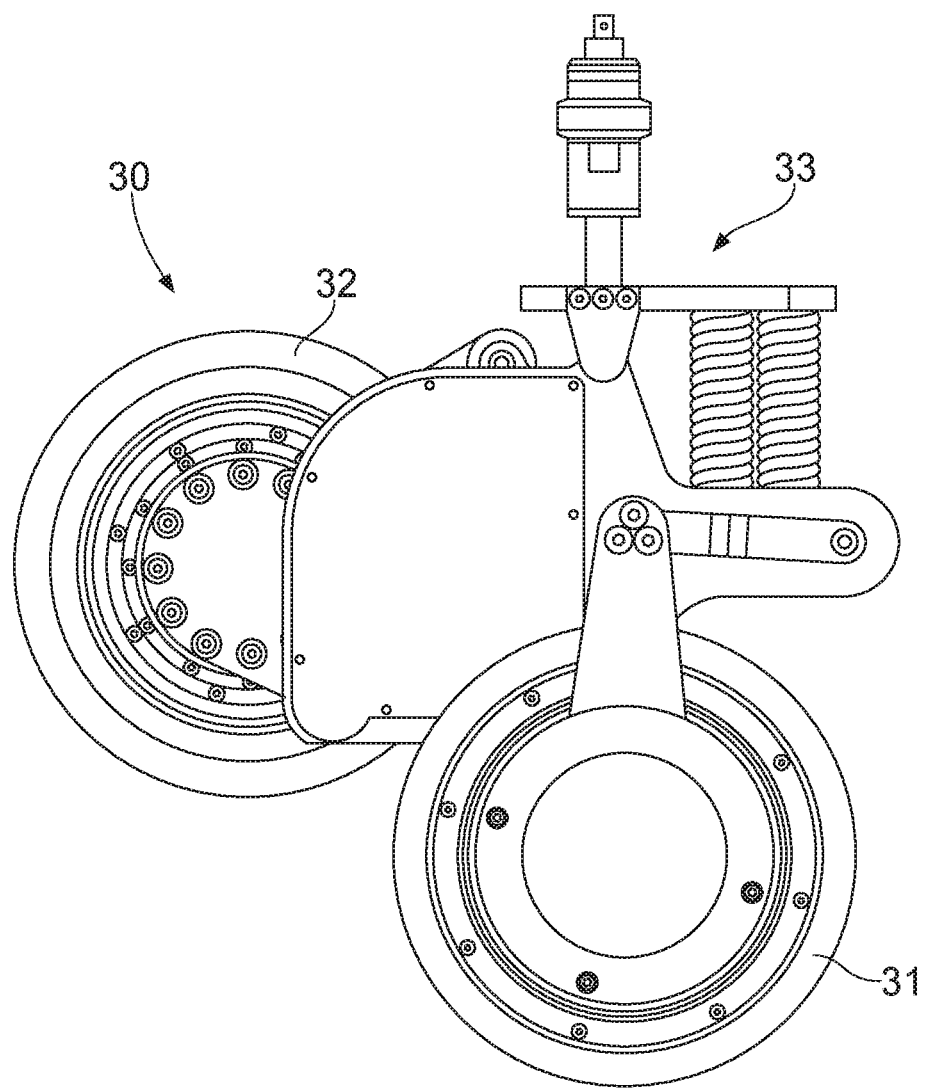

As FIGS. 5a to 5c depict, the castor wheel 30 can comprise two separately rotatable wheels 31, 32 mounted in a parallel arrangement. Each wheel 31, 32 is mounted to a chassis support member 33 through a linkage arrangement.

The linkage arrangement allows one of the wheels 31 to be firstly raised and move forward relative to the other wheel 32 (see FIG. 5b) so ensuring that there is always surface contact during the transition of the wheeled chair 100 up a step or over an obstacle.

The linkage arrangement also allows one of the wheels 31 to be relatively lowered and move forward relative to the other wheel 32 (see FIG. 5c) so ensuring that there is always surface contact during the transition of the wheeled chair 100 down a step.

The first drive wheels 11 can provide propulsion to the wheeled chair. When necessary, the second driven wheels 17 can also provide propulsion to the wheeled chair.

The attachment 10 can be used to assist in stabilising the wheeled chair 100 when transitioning onto an upwardly or downwardly extending ramp. In this regard, the second wheel or wheels 17 act essentially as an anti-tipping device for the wheeled chair.

For example, as the wheeled chair approaches an upwardly extending ramp, the second wheel or wheels 17 can tractionally contact the ramp and provide support and propulsion to the wheeled chair even when the first wheels 11 lift off the ground or lose full traction.

In another embodiment, it is possible for the second wheel or wheels 17 to be lowered to the ground even during normal forward or backwards movement of the wheeled chair. This can be done to increase overall traction of the wheeled chair with the ground and/or stability of the wheeled chair.

In yet another embodiment, it will be appreciated that the step-climbing attachment 10 can be used to provide greater ground clearance for the wheeled chair during operation. It can also be used simply to raise the relative height of the chair even when no obstacle is to be avoided or a step needs to be navigated. This can be useful when the chair occupant simply needs to be seated at a height that is relatively greater than the usual height of the chair. This might be the case, for example, where the occupant wishes to reach items on a desk or bench.

Figure 6:
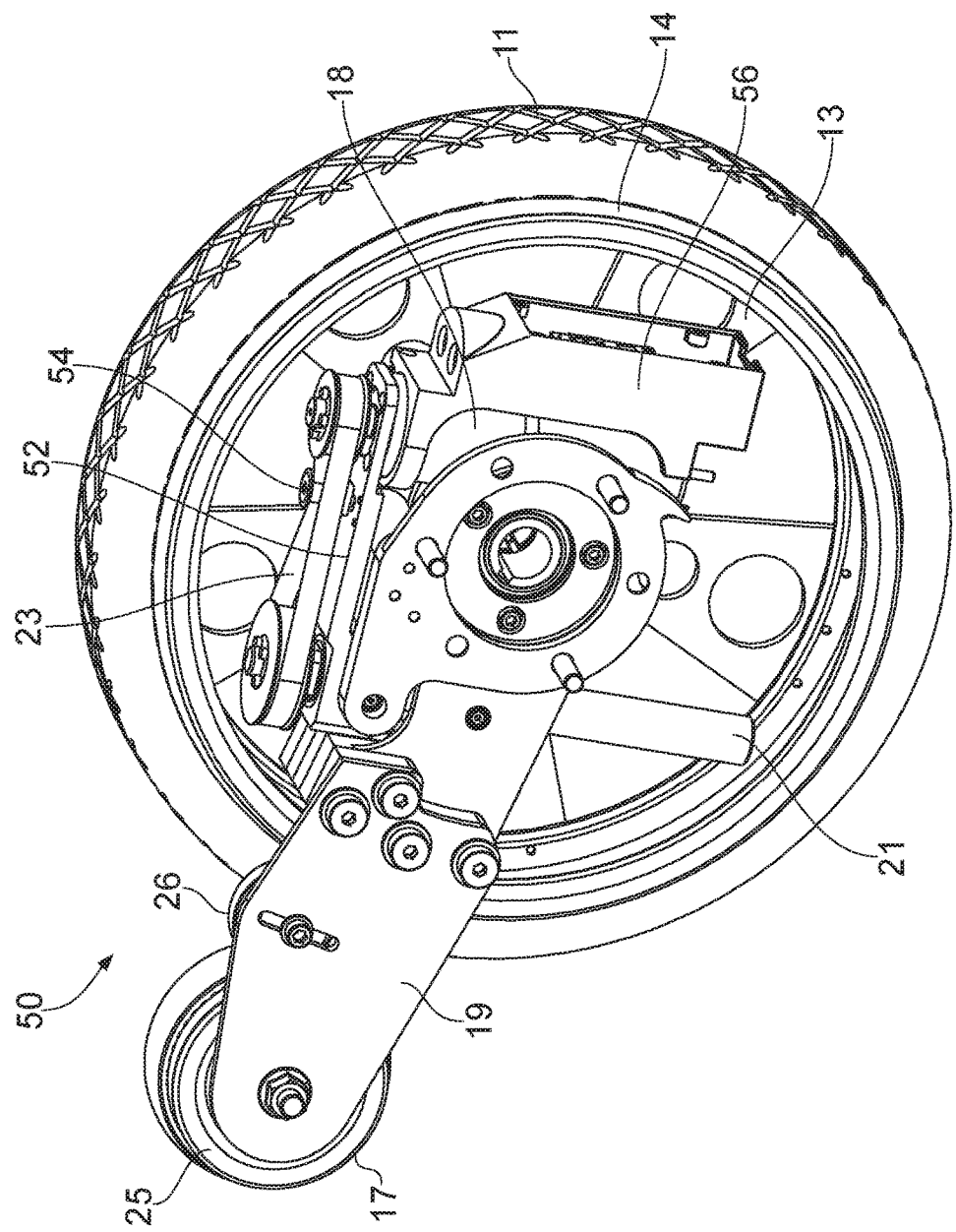
FIG. 6 is a side elevational view of a modified step-climbing attachment.
Figure 7:
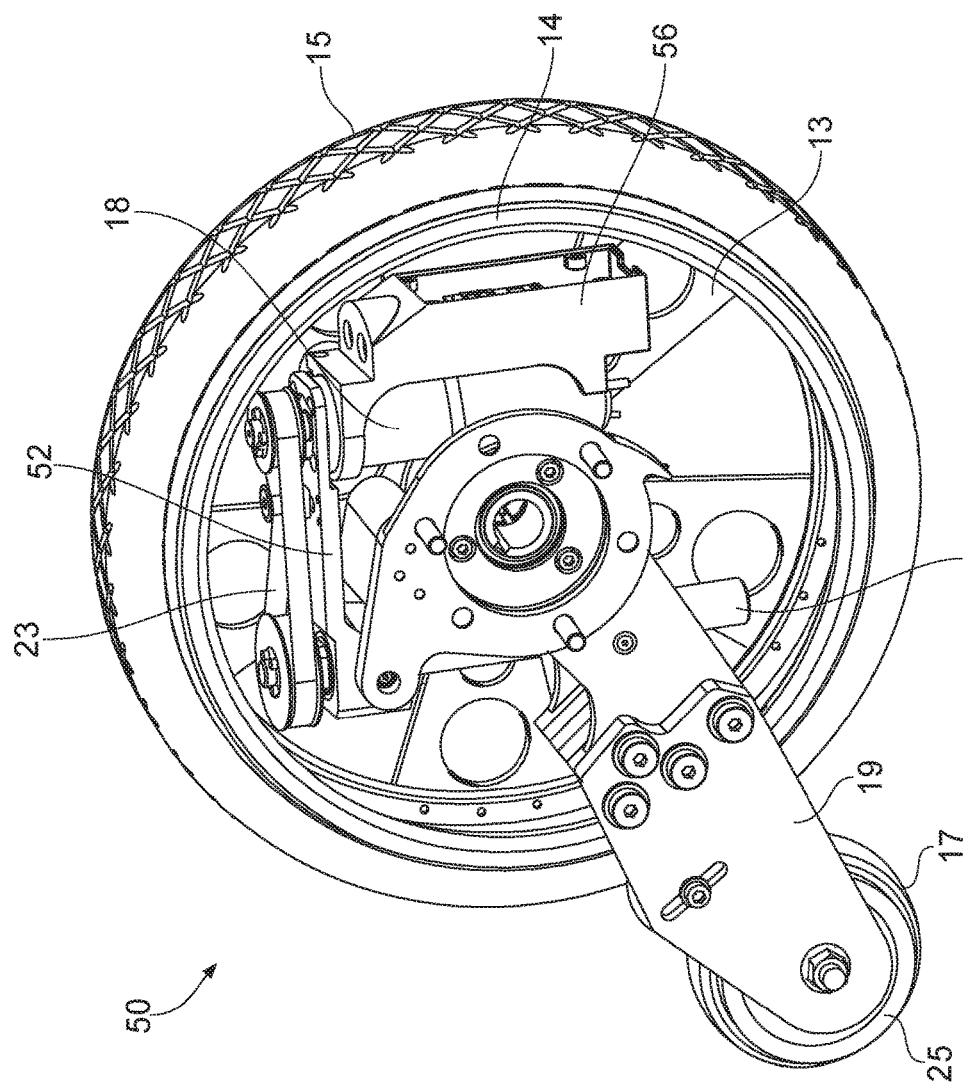
FIG. 7 is a side elevational view of the modified step-climbing attachment.
Figure 8:
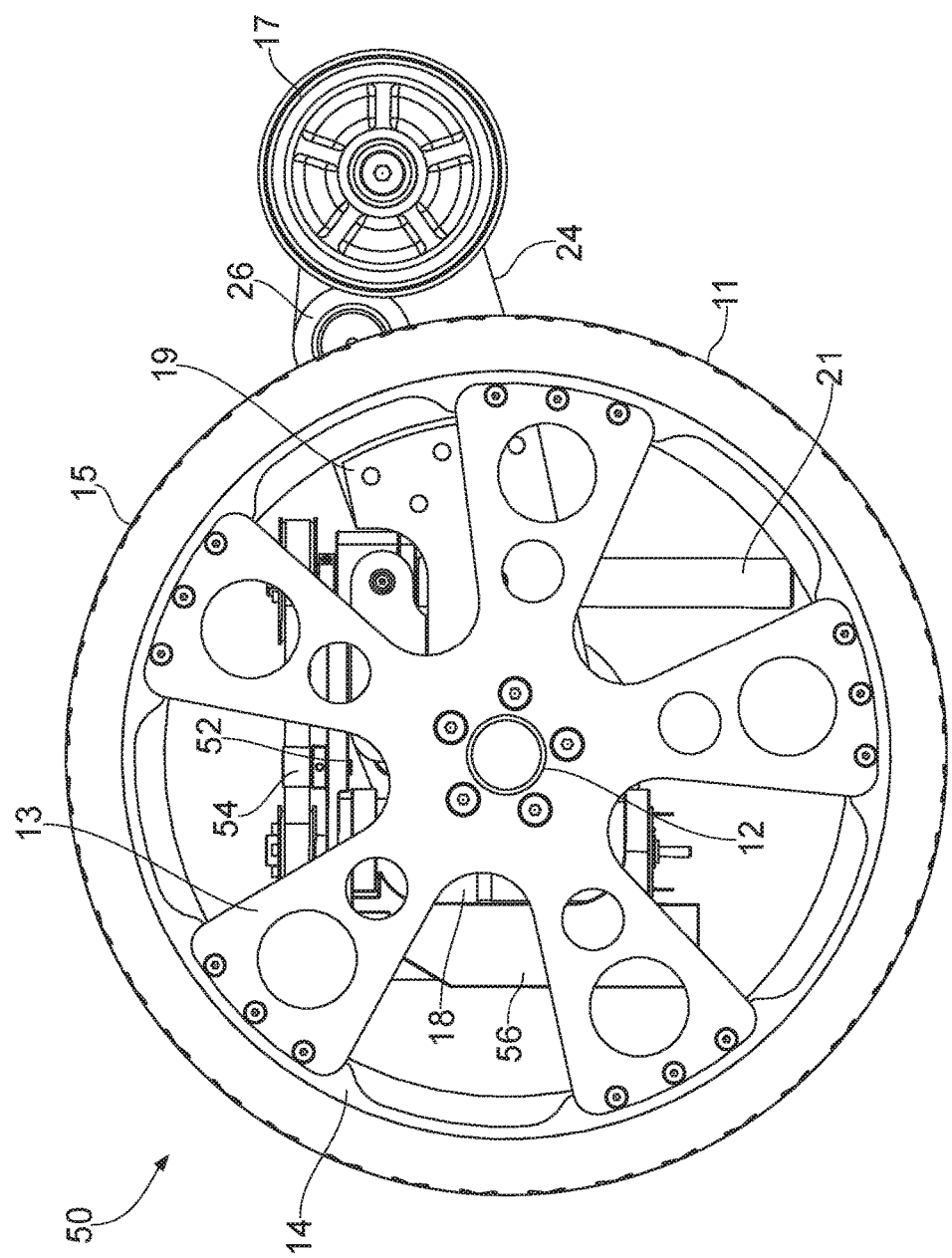
FIG. 8 is a side view of the modified step-climbing attachment.

FIGS. 6 to 8 depict a modified version of the attachment 10, where like parts have been given like reference numerals. In the attachment 50, the bracket 42, bearing housing 44 and motor bracket 46 have been replaced by a combined bracket 52 to eliminate the fastener joints, thereby increasing the strength of the mechanism, which in turn reduces loss of tension in the timing belt 23. It will be seen from FIGS. 6 to 8 that belt tension can be provided using a cam roller 54 abutting the belt 23. The bracket 52 may be manufactured from mild steel. Additionally, a controller housing 56 is provided within wholly within the wheel radius between the hub 12 and the rim 14. The controller housing 56 is configured to house motor driver and control electronics for the controllable mechanism 16, thus reducing overall system footprint. In the embodiment shown, the controller housing 56 is affixed to the motor 18. In other embodiments, however, the housing 56 may be affixed to other elements of the attachment which do not rotate with either of the wheels 11, 17. In some embodiments, the controller housing 56 maybe 3D printed from SLS nylon. While the above description focuses on a wheeled chair, it will be appreciated that the attachment 10 can also be used on other devices including trolleys, walkers, wheelbarrows, chairs, scooters, or the like. It is to be understood that any reference to wheeled chair in this specification could be replaced with other wheeled devices, such as trolleys, walkers, wheelbarrows, chairs, scooters, or the like.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A step-climbing attachment for a wheeled chair, the attachment comprising:
   a first wheel having at least a hub and a rim spaced from the hub, the hub and rim defining an inner region;
   a second wheel having a different diameter than the first wheel; and
   the second wheel being rotatably mounted to an extending arm;
   the extending arm being movable relative to the first wheel between a first position and at least one second position and a controllable motor configured to independently actuate the extending arm between the first position and the second position;

wherein the controllable motor is housed at least partially within the inner region of the first wheel; and wherein the second wheel is driven by rotation of the first wheel.

2. The step-climbing attachment of claim 1 wherein the controllable motor is substantially housed with the inner region of the first wheel.

3. The step-climbing attachment of claim 2 wherein the controllable motor is wholly housed with the inner region of the first wheel.

4. A wheeled chair comprising at least one step-climbing attachment as defined in claim 1.

5. The wheeled chair of claim 4 further comprising two step-climbing attachments.

6. The wheeled chair of claim 4 further comprising a controller housing substantially housed within the inner region of the first wheel.

7. A method of modifying a wheeled chair to allow the wheeled chair to climb or descend one or more steps, or the like comprising:

removing at least one drive wheel from the wheeled chair; and attaching a step-climbing attachment as defined in claim 1 to the wheeled chair.

8. A method of operating a wheeled chair to climb a step, the wheeled chair having at least one step-climbing attachment as defined in claim 1, the method comprising:

driving the chair towards a step having a tread portion with the first wheel on a surface in front of the step;

rotating the extending arm relatively toward a surface of the step or the tread portion of the step to move the second wheel into tractional engagement with the step or the tread portion of the step;

continuing the relative rotation of the extending arm in substantially the same direction so elevating the first wheel from a surface in front of the step and eventually to a position where the first wheel can tractionally engage the step or the tread portion of the step; and simultaneously or relatively shortly after commencement of rotation of the extending arm, driving the first wheel which in turn or additionally causes the second wheel which is tractionally engaged with the step or the tread portion of the step, to propel the chair forward.

9. A method of operating a wheeled chair to descend a step, the wheeled chair having at least one step-climbing attachment as defined in claim 1, the method comprising:

driving the chair towards the edge of a step with the first wheel on a surface in front of the step and until the second wheel is positioned beyond the step edge;

rotating the extending arm relative to the first wheel to move the second wheel toward and into tractional engagement with a surface that is below the step; and driving the first wheel which in turn or additionally causes the second wheel to propel the chair forward so that the second wheel is supporting the chair.

10. The method of claim 9 wherein the method further comprises:

relatively rotating the extending arm upwardly so elevating the second wheel from the surface on which the second wheel has been tractionally engaged and allowing the first wheel to move relatively downwardly into contact with the surface below the step.

* * * * *